United States Patent
Krummrich

(10) Patent No.: US 6,937,386 B2
(45) Date of Patent: Aug. 30, 2005

(54) METHOD FOR TRANSMITTING ADDITIONAL OPTICAL SIGNALS IN THE S+ BAND

(75) Inventor: Peter Krummrich, München (DE)

(73) Assignee: Siemens Aktiengesellschaft, Munich (DE)

( * ) Notice: Subject to any disclaimer, the term of this patent is extended or adjusted under 35 U.S.C. 154(b) by 230 days.

(21) Appl. No.: 10/220,487

(22) PCT Filed: Feb. 12, 2001

(86) PCT No.: PCT/DE01/00525
§ 371 (c)(1), (2), (4) Date: Aug. 29, 2002

(87) PCT Pub. No.: WO01/65737
PCT Pub. Date: Sep. 7, 2001

(65) Prior Publication Data
US 2003/0021013 A1 Jan. 30, 2003

(30) Foreign Application Priority Data
Mar. 2, 2000 (DE) ........................ 100 10 237

(51) Int. Cl.$^7$ ................................ H01S 3/00
(52) U.S. Cl. .................... 359/334; 359/341.3
(58) Field of Search ........................ 359/334

(56) References Cited

U.S. PATENT DOCUMENTS 6,163,636 A * 12/2000 Stentz et al. .......... 385/24
6,501,593 B2 * 12/2002 Akasaka et al. ....... 359/341.31
6,618,192 B2 * 9/2003 Islam et al. ........... 359/334

FOREIGN PATENT DOCUMENTS

JP 2001255563 A * 9/2001
WO WO 99/49580 9/1999

OTHER PUBLICATIONS

Kani et al. —Wideband and flat gain optical amplification from 1460 to 1510 nm by serial combination of a thulium doped fluoride fibre amplifier and fibre Raman amplifier pp. 1004–1006.
Kani et al. "Triple Wavelength Band WDM Transmission Over Cascaded Dispersion Shifted Fibers", pp. 1506–1508.
Kani et al "Wavelength band nonlinear interactions and their suppression in multiwavelength band WDM transmission systems" pp. 2249–2260.
Kani et al. "Trinal wavelength band WDM transmission over dispersion shifted fibre" pp. 321–322.

* cited by examiner

*Primary Examiner*—Mark Hellner
(74) *Attorney, Agent, or Firm*—Bell Boyd & Lloyd LLC

(57) ABSTRACT

The invention relates to the transmission of optical signals ($C-B_{ein}$, $L-B_{ein}$) in conventional transmission bands, especially C-bands and L-bands, and of additional optical signals ($S^+-B_{ein}$) in the $S^+$-band by means of an optical fiber (OF). At least one optical pump signal (ps1, ps2) is coupled into the optical fiber (OF) for amplifying the additional optical signals ($S^+-B_{ein}$) by means of the Raman effect, whereby said additional signals are transmitted in the $S^+$-band. The wavelength of the at least one optical pump signal (ps1, ps2) is situated in the wave range of 1,320 nm to 1,370 nm.

5 Claims, 1 Drawing Sheet

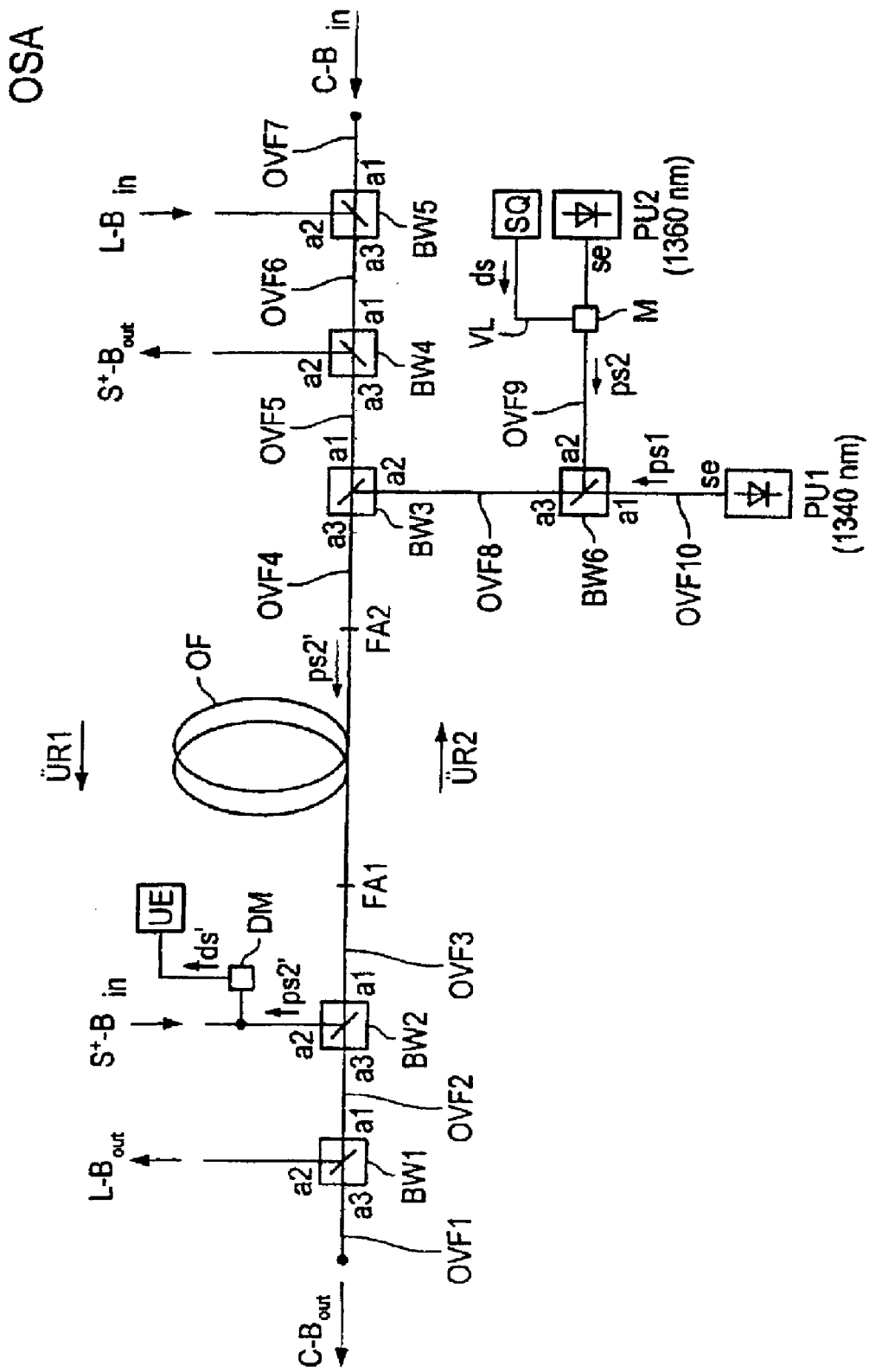

METHOD FOR TRANSMITTING ADDITIONAL OPTICAL SIGNALS IN THE S+ BAND

The invention relates to a method for transmitting optical signals in conventional transmission bands and additional optical signals in the S+ band via an optical fiber.

On account of the rapid growth of the Internet, it is possible to identify a constantly increasing need for powerful transmission capacity in wide area technology, particularly in optical transmission systems. In this context, optical transmission systems, particularly transmission systems operating on the basis of the WDM principle (Wavelength Division Multiplexing), provide an opportunity for additionally increasing the data capacity which can be transmitted via an optical fiber by increasing the number of WDM channels used. At the present time, optical signals are predominantly transmitted in the C band (wavelength range for the WDM channels of approximately 1530–1560 nm), with first optical transmission systems of the L band (wavelength range for the WDM channels of approximately 1570 to 1605 nm) having already been announced—conventional transmission bands. In addition, the development of the thulium-doped optical amplifier with a useful gain spectrum in the S+ band (wavelength range for the WDM channels of approximately 1450 to 1510 nm) has permitted additional transmission of further optical WDM channels in the S+ band, as a result of which it is possible to produce an additional increase in the optical transmission capacity.

In existing and future optical WDM transmission systems, optical signals or transmission signals are transmitted primarily in the C band. In the course of extending already installed C-band transmission systems, it would be advantageous, in particular, for an already existing C-band transmission system to be additionally used for transmission in the L and S+ bands. In this context, a fundamental criterion for designing such an optical transmission system is the optical path attenuation. The spectral path attenuation minimum for the optical fiber or transmission fiber, particularly a silicate glass fiber, (approximately 0.19 dB/km) is in the wavelength range around 1550 nm. Both in the C band and in the L band, the path attenuation for the WDM channel wavelengths furthest away from the path attenuation minimum increases by approximately 0.01 dB/km. By contrast, the sharp increase in the path attenuation profile in the optical fiber means that the shorter wavelengths in the S+ band have a path attenuation which is higher by approximately 0.1 dB/km, i.e. a path attenuation of approximately 0.29 dB/km, than the minimum fiber attenuation in the C band. This means that WDM channels in the S+ band are subject to a much higher path attenuation than WDM channels in the conventional transmission bands—the C and L bands.

Furthermore, the publication "Trinal-wavelength band WDM transmission over dispersion-shifted fibre" by J. Kani, et al., Electronic Letters, Feb. 18, 1999, vol. 35, No. 4 discloses that the stimulated Raman scatter at high channel levels or total powers for the optical transmission signals can cause additional attenuation of the WDM channels in the S+ band. In this context, the stimulated Raman effect produced in the S+ band transfers energy from the shorter wavelengths—S+ band—to longer wavelengths—C and L bands—and thereby increases the channel levels of the WDM channels in the C and L bands at the cost of the WDM channels in the S+ band.

The relatively high path attenuation in the S+ band can, in principle, be equalized by relatively high channel levels at the optical fiber input. In this context, however, the maximum channel level which can be produced for transmitting the optical signals is limited by the nonlinear effects arising in the optical fiber, such as self phase modulation or four wave mixing. However, when operating optical transmission systems in the C and L bands using such high channel levels, the channel levels of the transmission channels transmitted in the S+ band cannot be increased to the required degree.

Another approach is to use lower channel data rates in the S+ band than in the C and L bands. With comparable channel levels at the fiber input, the WDM channels in the S+ band have a relatively low optical signal-to-noise ratio (OSNR) on account of the relatively high fiber attenuation. The relatively low channel data rates in the S+ band mean that the existing low signal-to-noise ratios in the S+ band can be evaluated using optical receivers for low data rates, however, which makes the relatively high path attenuation in the S+ band tolerable.

The object on which the invention is based is that of transmitting further WDM channels in an already existing optical WDM transmission system in the S+ band without any great technical complexity, and, as a further object, that of equalizing the increased fiber attenuation in the S+ band as compared with the C and L bands. The object is achieved, on the basis of a method in accordance with the feature of the pre-characterizing part of patent claim 1, by the features of the characterizing part.

The fundamental aspect of the inventive method can be seen, in particular, in that at least one optical pump signal is launched into the optical fiber for the purpose of amplifying the additional optical signals transmitted in the S+ band on the basis of the Raman effect, the wavelength of the at least one optical pump signal being in the wavelength range from 1320 nm to 1370 nm. In a particularly advantageous manner, this specifically equalizes the relatively high path attenuation in the S+ band using the stimulated Raman scatter in the optical transmission fiber, i.e. particularly the WDM channels in the S+ band and the additional optical signals to be transmitted in the S+ band are subject to an effective gain but the channels in the C and L bands are amplified only to a limited extent. The inventive method thus presents a simple technical method for upgrading an already existing optical WDM transmission system for transmitting further WDM channels, particularly in the S+ band, with little technical complexity.

Another fundamental advantage of the inventive method can be seen in that the amplitude of the at least one optical pump signal is chosen such that the fiber attenuation differences in the C band, L band and S+ band of the optical fiber are virtually equalized—claim 2. The inventive choice of the amplitude of the at least one optical pump signal makes it possible, in a particularly advantageous manner, to compensate for the relatively high fiber dispersion in the S+ band until it corresponds approximately to the fiber dispersion in the C band and in the L band of the optical fiber.

Another advantage of the inventive method can be seen in that at least two optical pump signals having different wavelengths and/or light outputs are launched into the optical transmission medium for the purpose of matching the levels of the amplified optical signals to a prescribed amplitude profile—claim 3. The inventive alignment of the pump wavelength and of the pump power for the optical pump signals allows the levels of the additional optical signals transmitted in the S+ band to be amplified such that the levels of the additional optical signals have a prescribed amplitude profile after transmission in the S+ band, which makes it possible to compensate for the path attenuation spectrum in the S⁺ band virtually completely.

In addition, the invention involves the at least one optical pump signal being launched into the optical transmission medium in the opposite direction to the amplified additional optical signals—claim 4. Furthermore, the optical pump signal can be modulated with a data signal in order to produce a monitoring channel—claim 5, the modulation frequency for this being chosen to be greater than 10 kHz. To reduce or to prevent disruptive overcoupling between the intensity noise of the optical pump signals and the optical signals or transmission signals in the frequency range used for transmission, the invention involves at least one optical pump signal being launched into the optical fiber in the opposite direction to the amplified additional optical signals, i.e. the S⁺ band in the optical transmission link is pumped in the opposite direction. Such a contradirectional pump configuration results in a low-pass filter characteristic with a cutoff frequency of approximately 10 kHz, i.e. the contradirectional pumping means that the optical pump signals have similar signal distortion to in the case of low-pass filtering using a low-pass filter which has a cutoff frequency of approximately 10 kHz. This effect can be utilized to produce further transmission channels by using a pump signal modulated significantly above the cutoff frequency of approximately 10 kHz to transmit additional data or data signals.

The invention is explained in more detail below with reference to a block diagram.

FIG. 1 shows, by way of example, a configuration for an optical path section OSA, with the optical path section OSA representing a WDM transmission system part which can be used to implement data transmission in the C, L and S⁺ bands, i.e. in the WDM channels represented by the respective bands. The optical path section OSA shown in FIG. 1 has an optical transmission fiber OF with a first fiber connection FA1 and a second fiber connection FA2. Furthermore, a first to sixth bandpass filter BW1 to BW6 with a respective first, second and third connection a1, a2, a3 is provided which can be used to launch or output optical transmission signals or signals OS. The connections a1 to a3 on the optical bandpass filters BW1 to BW6 are connected by means of first to tenth optical connecting fibers OVF1 to OVF10. To produce optical pump signals ps1,ps2, the optical path section OSA shown in FIG. 1 is provided with a first optical pump unit PU1 and a second optical pump unit PU2.

The first optical connecting fiber OVF1 is connected to the third connection a3 of the first optical bandpass filter BW1, and the first connection a1 of the optical bandpass filter BW1 is routed to the third connection a3 of the second optical bandpass filter BW2 via the second optical connecting fiber OVF2. Furthermore, the first connection a1 of the second optical bandpass filter BW2 is connected to the first fiber connection FA1 of the optical fiber OF or transmission fiber OF via the third optical connecting fiber OVF3. The second fiber connection FA2 of the optical fiber OF is routed to the third connection a3 of the third optical bandpass filter BW3 via the fourth optical connecting fiber OVF4, and the second connection a2 of the third optical bandpass filter BW3 is connected to the third connection a3 of the sixth optical bandpass filter BW6 via an eighth optical connecting fiber OVF8. The first connection a1 of the third optical bandpass filter BW3 is connected to the third connection a3 of the fourth optical bandpass filter BW4 via the fifth optical connecting fiber OVF5, the first connection a1 of said third connection having the third connection a3 of the fifth optical bandpass filter BW5 connected to it via the sixth optical connecting fiber OVF6. The first connection a1 of the fifth optical bandpass filter BW5 is finally connected to the seventh optical connecting fiber. The sixth optical bandpass filter BW6 is connected to the first and second optical pump units PU1, PU2, with, in particular, the first connection a1 of the sixth optical [lacuna] BW6 being connected to the signal output se of the first optical pump unit PU1, and the second output connection a2 of the sixth optical bandpass filter BW6 being connected to the signal output se of the second optical pump unit PU2.

In the inventive optical WDM transmission system, an optical C-band signal C-$B_{in}$, an optical L-band signal L-$B_{in}$, and an optical S⁺-band signal S⁺-$B_{in}$ are thus transmitted, for example, the optical C-band signal C-$B_{in}$, the optical L-band signal L-$B_{in}$ and the optical S⁺-band signal S⁺-$B_{in}$ each being able to contain a plurality of WDM channels. The optical C-band signal C-$B_{in}$ is launched into the seventh optical connecting fiber OVF7 at the start of the optical path section OSA shown in FIG. 1. The optical C-band signal C-$B_{in}$ is transmitted from the seventh optical connecting fiber OVF7 via the fifth optical bandpass filter BW5 and via the sixth optical connecting fiber OVF6 to the fourth optical bandpass filter BW4. The fourth optical bandpass filter BW4 forwards the optical C-band signal C-$B_{in}$ to the third optical bandpass filter BW3 via the fifth optical connecting fiber OFV5, and the third optical bandpass filter outputs said optical C-band signal to the second fiber connection FA2 of the optical fiber OF via the fourth optical connecting fiber OFV4.

Following transmission of the C-band signal C-$B_{in}$ via the optical fiber OF, the optical C-band signal C-$B_{in}$, at the first fiber connection FA1 of the optical fiber OF is output to the second optical bandpass filter BW2 via the third optical connecting fiber OVF3. The second optical bandpass filter transmits the optical C-band signal C-$B_{in}$ to the first optical bandpass filter BW1 via the second optical connecting fiber OVF2 and finally to the end of the optical path section OSA shown in FIG. 1 via the first optical connecting fiber OVF1. The output or end of the first optical connecting fiber OFV1 thus outputs an optical C-band signal C-$B_{out}$ which has been transmitted via the optical path section OSA.

In addition to the optical C-band signal C-$B_{in}$, an optical L-band signal L-$B_{in}$ is transmitted which is launched into the sixth optical connecting fiber OVF6 via the fifth optical bandpass filter BW5, i.e. the L-band signal L-$B_{in}$ is routed to the second connection a2 of the fifth optical bandpass filter BW5 and is thus launched into the sixth optical connecting fiber OVF6 connected to the third connection a3 of the fifth optical bandpass filter BW5. The optical L-band signal L-$B_{in}$ and the optical C-band signal C-$B_{in}$ are transmitted via the optical path section OSA in a first transmission direction UR1. The optical L-band signal L-$B_{in}$ is thus transmitted to the fourth optical bandpass filter BW4 via the sixth optical connecting fiber OVF6 and finally to the third optical bandpass filter BW3 via the subsequent fifth optical connecting fiber OVF5. The third optical bandpass filter BW3 outputs the optical L-band signal L-$B_{in}$ to the second fiber connection FA2 of the optical fiber OF via the fourth optical connecting fiber OVF4, transmits it via the optical fiber OF and, at the first fiber connection FA1 of the optical fiber OF, supplies it to the second optical bandpass filter BW2 via the third optical connecting fiber OVF3. The second optical connecting fiber OVF2 connected to the third connection a3 of the second optical bandpass filter BW2 is used to transmit the optical L-band signal L-$B_{in}$ to the first connection a1 of the first optical bandpass filter BW1, where the optical L-band signal L-$B_{in}$ is output and is passed to the second connection a2. The optical L-band signal $L\text{-}B_{out}$ transmitted, in accordance with the invention, via the optical path section OSA can consequently—not shown in FIG. 1—be supplied to a processing device for further processing.

In contrast to the optical L-band signal $L\text{-}B_{in}$, the optical $S^+$-band signal $S^+\text{-}B_{in}$ is transmitted in a second transmission direction UR2, running in the opposite direction to the first transmission direction UR1, i.e. the optical $S^+$-band signal $S^+\text{-}B^{in}$ propagates in the opposite direction to the optical C-band signal $C\text{-}B_{in}$ and in the opposite direction to the optical L-band signal $L\text{-}B_{in}$ in the optical fiber OF. The optical $S^+$, band signal $S^+\text{-}B_{in}$ is launched via the second connection a2 of the second optical bandpass filter BW2 into the third optical connecting fiber OVF3 connected to the first connection a1 of the second optical bandpass filter BW2 and is routed to the first fiber connection FA1 of the optical fiber OF. Following transmission of the optical $S^+$-band signal $S^+\text{-}B_{in}$ via the optical fiber OF in the second transmission direction OR2, the optical $S^+$-band signal $S^+\text{-}B_{in}$ is output at the second fiber connection FA2 and is supplied to the third optical bandpass filter BW3 via the fourth optical connecting fiber OVF4. The third optical bandpass filter BW3 supplies the $S^+$-band signal $S^+\text{-}B_{in}$ via the fifth optical connecting fiber OVF5 to the third connection a3 of the fourth optical bandpass filter BW4, where it is output and the second connection a2 outputs the transmitted optical $S^+$-band signal $S^+\text{-}B_{out}$. The optical $S^+$-band signal $S^+\text{-}B_{out}$ which is output using the fourth optical bandpass filter BW4 and is transmitted via the optical path section OSA can be supplied to a further processing device for further processing—not shown in FIG. 1.

The pump units PU1, PU2 provided for the inventive amplification of the optical WDM channels or the optical $S^+$-band signals $S^+\text{-}B_1$, transmitted in the $S^+$ band are implemented as below in the exemplary embodiment shown. The first optical pump unit PU1 produces a first optical pump signal PS1 with a pump wavelength of 1340 nm, for example. The second optical pump unit PU2 forms a second optical pump signal PS2 with a pump wavelength of 1360 nm, where the pump wavelength can inventively be chosen lie from the wavelength range of 1320 nm to 1370 nm. In this context, the amplitude of the first and second optical pump signals ps1,ps2 is chosen such is that the fiber attenuation differences in the C band, L band and $S^+$ band of the optical transmission fiber OF are virtually equalized. In addition, the use of a first and a second optical pump unit PU1, PU2 shapes the Raman gain spectrum inventively forming in the $S^+$ band such that the WDM channels in the optical $S^+$ band are amplified virtually evenly or the amplified optical $S^+$, band signals $S^+\text{-}B_{in}$, have a prescribed amplitude profile when they have been transmitted via the optical fiber OF.

In the exemplary embodiment shown in FIG. 1, this is done, by way of example, by choosing a frequency difference between the first and the second pump signal PS1, PS2 of approximately 20 nm in order to produce a Raman gain spectrum which is matched to the $S^+$-band signals $S^+\text{-}B_{in}$ which are to be amplified. The first pump signal ps1 is output by the first optical pump unit PU1 at the signal output se and is transmitted via the tenth optical connecting fiber OVF10 to the first connection a1 of the sixth optical bandpass filter BW6. In a similar manner, the second optical pump unit PU2 outputs the second optical pump signal ps2 at the signal output se and routes it via the ninth optical connecting fiber OVF9 to the second connection a2 of the sixth optical bandpass filter BW6. The sixth optical bandpass filter BW6 combines the first and second optical pump signals ps1, ps2 with one another and forwards them jointly to the third connection a3 of the sixth optical bandpass filter BW6 and transmits them via the eighth optical connecting fiber OVF8 to the second connection a2 of the third optical bandpass filter BW3. Using the third optical bandpass filter BW3, the first and second optical pump signals ps1, ps2 are launched into the fourth optical connecting fiber OVF4 or into the optical fiber OF in the opposite direction to the optical $S^+$-band signal $S^+\text{-}B_{in}$, i.e. in the first transmission direction UR1. The optical path section OSA is thus pumped in opposite directions using the first and second optical pump signals ps1, ps2, i.e. the levels of the WDM channels transmitted in the $S^+$ band are increased or amplified in the opposite direction to the propagation direction using the first and second optical pump signals ps1, ps2, and hence the increased path attenuation in the $S^+$ band for conventional silicate glass fibers is reduced.

Such a contradirectional pump configuration results in a low-pass filter characteristic with a coupling cutoff frequency of approximately 10 kHz, since the interaction length of the optical $S^+$-band signal $S^+\text{-}B_{in}$ propagating in the opposite direction is passed through in a time period of approximately 0.1 ms.

As a result of the contradirectional pumping of the optical transmission fiber OF, the invention produces a Raman gain spectrum, forming in the $S^+$ band, which effectively compensates for the path attenuation in the $S^+$ band or amplifies the levels of the WDM channels transmitted in the $S^+$ band in the optical fiber OF.

Furthermore, the low-pass filter characteristic, brought about by the contradirectional pump configuration, with a coupling cutoff frequency of approximately 10 kHz permits the first and/or second pump signal ps1, ps2 to be modulated with a data signal ds at a modulation frequency much greater than 10 kHz, which means that it will be possible to produce a monitoring channel for the optical path section OSA, for example. To this end, FIG. 1 contains a signal source SQ for producing a data signal ds, said signal source being connected to a modulator M, for example a Mach-Zehnder modulator, by means of a connecting line VL. The modulator M is connected into the ninth optical connecting fiber OVF9 between the second pump unit PU2 and sixth optical bandpass filter BW6. The second optical pump signal ps2 output at the signal output se of the second pump unit PU2 is transmitted to the modulator M and is modulated in the modulator M with the data signal ds produced by the data signal source SQ. The modulated second optical pump signal ps2' is launched, in a similar manner to the second optical pump signal ps2, into the optical fiber OF via the sixth optical bandpass filter BW6 and the third optical bandpass filter BW3. Following transmission via the optical fiber OF, the modulated second optical pump signal ps2' is output using the second optical bandpass filter BW2 and is supplied, by way of example, to a demodulator DM connected to the second connection a2. The demodulator is used to demodulate the modulated second optical pump signal ps2' and to recover the data signal ds'. The recovered data signal ds' is supplied to a monitoring device UE for the purpose of monitoring the optical path section OSA and is evaluated in the monitoring device UE.

In another implementation option, for the purpose of modulating one of the two optical pump signals ps1,ps2, the actuating signal for one of the two pump units PU1, PU2, particularly the laser unit contained therein, can actually be modulated with the data signal ds, for example—not shown in FIG. 1.

Furthermore, the inventive method is not limited exclusively to transmission of optical $S^+$-band signals $S^+\text{-}B_{in}$ in addition to C-band signals $C\text{-}B_{in}$ and L-band signals $L\text{-}B_{in}$, but rather a WDM transmission system can also be used, in accordance with the inventive method, for transmitting exclusively optical $S^+$-band signals $S^+\text{-}B_{in}$.

The application of the inventive method is by no means limited to the WDM transmission system, but rather can be used for producing any optical transmission paths OSA.

What is claimed is:

1. A method for transmitting optical signals in conventional transmission bands and additional optical signals in an $S^+$ band via an optical fiber, the method comprising the steps of:
    launching at least one optical pump signal into the optical fiber;
    amplifying, via the at least one optical pump signal launched in the optical fiber, the additional optical signals transmitted in the $S^+$ band based on a Raman effect, with a wavelength of the at least one optical pump signal being in a wavelength range from 1320 nm to 1370 nm; and
    choosing an amplitude of the at least one optical pump signal such that fiber attenuation differences in a C band, an L band and the $S^+$ band of the optical fiber are substantially equalized.

2. A method for transmitting optical signals as claimed in claim 1, the method further comprising the step of launching at least two optical pump signals, having at least one of different wavelengths and different light outputs, into the optical fiber for purposes of matching levels of the amplified additional optical signals to a prescribed amplitude profile.

3. A method for transmitting optical signals as claimed in claim 1, wherein the at least one optical pump signal is launched into the optical fiber in an opposite direction to the amplified additional optical signals.

4. A method for transmitting optical signals as claimed in claim 1, the method further comprising the step of modulating the at least one optical pump signal with a data signal so as to produce a monitoring channel.

5. A method for optical signals as claimed in claim 4, wherein a modulation frequency is greater than 10 kHz.

* * * * *